Figure 1:
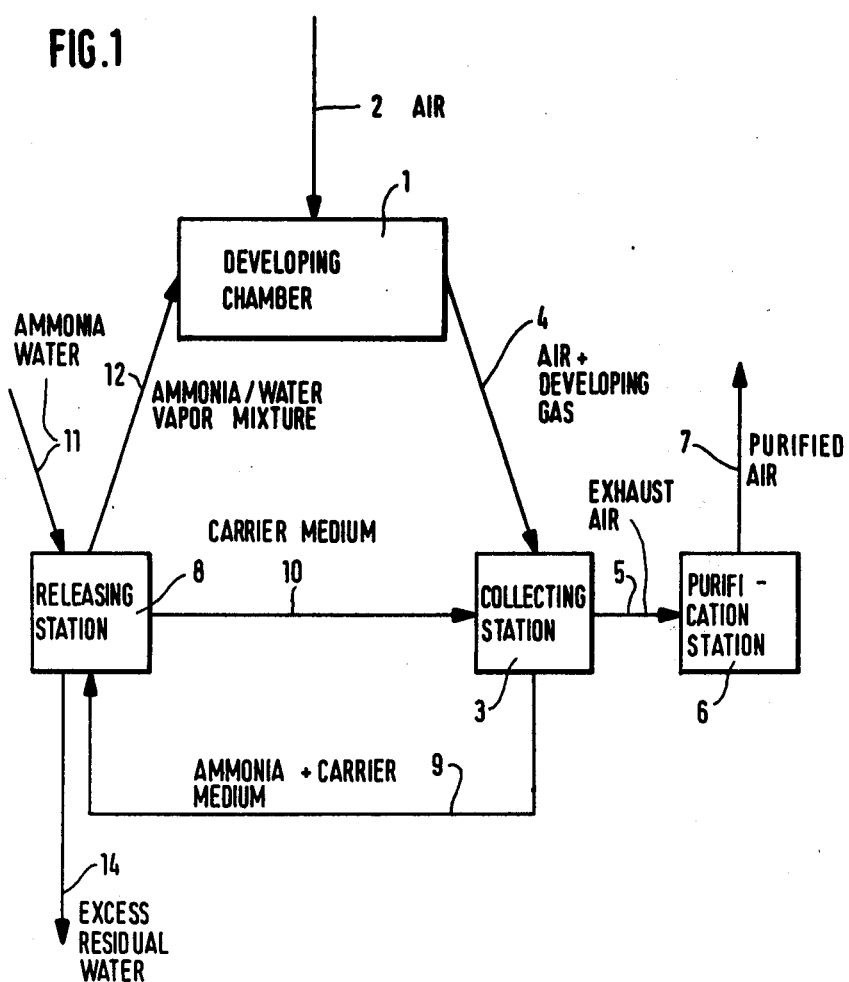

United States Patent [19]

Degenhardt et al.

[11] 4,166,728

[45] Sep. 4, 1979

[54] PROCESS FOR CONDUCTING AMMONIA IN COPYING MACHINES

[75] Inventors: Karl-Heinz Degenhardt, Bad Schwalbach; Hermann Frank, Sulzbach; Gerhard Marx, Taunusstein, all of Fed. Rep. of Germany

[73] Assignee: Hoechst Aktiengesellschaft, Fed. Rep. of Germany

[21] Appl. No.: 819,909

[22] Filed: Jul. 28, 1977

Related U.S. Application Data

[60] Division of Ser. No. 743,325, Nov. 19, 1976, abandoned, which is a continuation-in-part of Ser. No. 491,349, Jul. 24, 1974, abandoned.

[30] Foreign Application Priority Data

Jul. 26, 1973 [DE] Fed. Rep. of Germany ....... 2337961
Oct. 29, 1976 [DE] Fed. Rep. of Germany ....... 2649294
Oct. 30, 1976 [DE] Fed. Rep. of Germany ....... 2649975

[51] Int. Cl.² ............................................. B01D 59/02
[52] U.S. Cl. ........................................... 55/51; 55/70; 55/82; 354/300
[58] Field of Search ............... 55/70, 82, 269, 51; 62/13, 42, 55.5; 354/300

[56] References Cited

U.S. PATENT DOCUMENTS

| 2,116,191 | 5/1938 | De Baufre | 62/13 X |
| 2,500,291 | 3/1950 | Liebel et al. | 55/70 X |
| 3,570,383 | 3/1971 | Berg | 55/70 X |
| 3,720,150 | 3/1973 | Hurtig et al. | 55/70 X |

FOREIGN PATENT DOCUMENTS

| 2337961 | 2/1975 | Fed. Rep. of Germany | 55/70 |
| 1365759 | 9/1974 | United Kingdom | 55/70 |

*Primary Examiner*—Robert H. Spitzer

[57] ABSTRACT

This invention relates to a process for conducting ammonia in a diazo copying machine which comprises passing ammonia-containing exhaust air by first conduit means from a developing station of said copying machine through a cooled heat exchanger in which the ammonia and water is frozen out, then heating said heat exchanger to a temperature at which the water and the ammonia are liquified, passing the mixture of liquified water and liquified ammonia to a releasing station, adding fresh ammonia water to the liquified water and to the liquified ammonia, passing it together with the liquified water and liquified ammonia in the releasing station counter-currently to vapor produced by a vapor-generating means, and conducting the gaseous ammonia to the developing station, said process employing two heat exchangers, the first heat exchanger through which the exhaust air is passed being cooled and the second heat exchanger being heated for liquifying the ammonia and water frozen out during the preceding process step, whereby the second heat exchanger is cooled and the first heat exchanger is heated.

1 Claim, 13 Drawing Figures

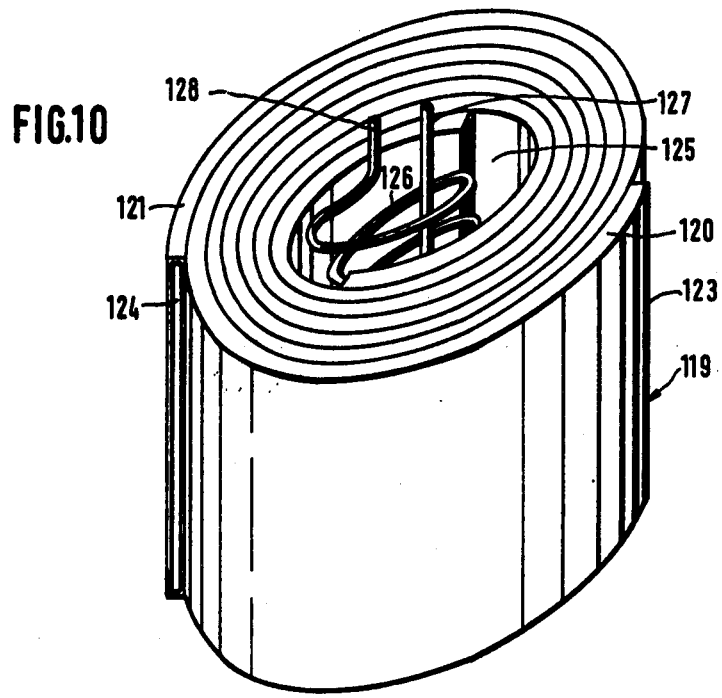
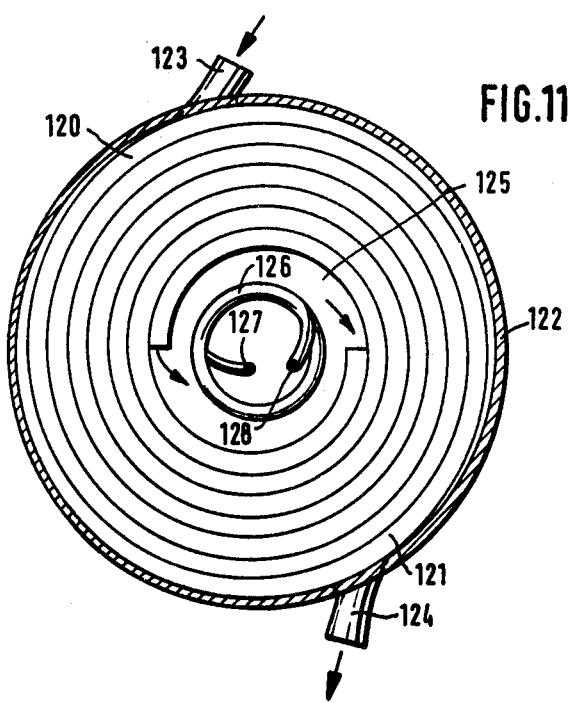

PROCESS FOR CONDUCTING AMMONIA IN COPYING MACHINES

This is a division, of application Ser. No. 743,325, filed Nov. 19, 1976, in turn a C.I.P. of Ser. No. 491,349, filed July 24, 1974 and now both abandoned.

The present invention relates to a process and apparatus for conducting ammonia in copying machines, particularly in the developing section of such machines, in which materials carrying diazo layers, such as microfilms and photoprints, are processed with an ammonia-containing developer medium. According to the invention, ammonia is separated from the exhaust air discharged adjacent to an input and/or an output opening of the developing section of the machine and is recirculated to the developing section.

In known copying machines, the ammonia-containing air escaping from the developing section is drawn off and conducted from the machine into the open through exhaust pipes.

Since gaseous ammonia is injurious to health and has an unpleasant acrid smell, even at very low concentrations, efforts have been made to keep the quantities of ammonia leaking into the surroundings as small as possible. This is also advisable for reasons of ecology.

German Offenlegungsschrift No. 1,522,867, discloses a developing chamber for microfilms, especially aperture cards, whose dimensions are very small (height of the chamber: 0.5 to 1 mm) and in which the ammonia gas acts under pressure upon the material to be developed. Before the developing chamber is opened for removal of the developed microfilm, the ammonia gas is conducted through a valve into a vessel filled with an absorbing medium, for example citric acid. Such absorbing media may be used for removing ammonia from small quantities of exhaust air, as are formed in a developing chamber of such small size.

The ammonia contained in the exhaust air may be removed either by a chemical reaction, such as a catalytic combustion, or by salt formation, such as by absorption in citric acid, or by absorption in water. The ammonia water produced by absorption in water cannot be drained off in this form into a sewage system, but first must be diluted to a permissible concentration.

It is the object of the present invention to maintain the quantities of ammonia used in copying machines as small as possible and, at the same time, reduce measures for the disposal of the ammonia separated from the exhaust air.

The present invention provides a process and apparatus for conducting ammonia in copying machines, in which the ammonia-containing exhaust air of the developing section is conducted to a collecting station where the ammonia is separated from the exhaust air. The ammonia taken up in the collecting station is then liberated in a releasing station and recirculated to the developing section.

The exhaust air drawn off from the developing section is conducted to a collecting station where the ammonia is removed from the exhaust air. The exhaust air freed from ammonia may then be conducted into the open.

Normally, ammonia/water vapor mixtures are used for the development of diazotype materials. It is possible for the water vapor to be removed together with the ammonia from the exhaust air in the collecting station, to be liberated in the releasing station, and recirculated to the developing section.

The collecting station may comprise, for example, one or more cooling traps where the water and ammonia contained in the exhaust air issuing from the developing section are separated by freezing-out. In the releasing station, water and ammonia are again evaporated and are conducted to the developing section for the development of the diazotype material. Since ammonia is used up during development, and ammonia and water are also absorbed by the developed material and carried out of the developing section, these losses must be compensated for. Fresh ammonia and, if necessary, additional water must be introduced into the cycle from without. In this manner, the concentration of ammonia and water vapor required for optimum development is maintained in the developing section.

Alternatively, the collecting station may contain a carrier for the ammonia which takes up the ammonia and releases it under other conditions. An absorbing medium, for example water, may be used as the carrier.

In this case, the ammonia collecting station comprises one or more absorption vessels. Preferably, a packed or plate-type column is used for absorption, in which the ammonia-containing exhaust air and the absorbing medium are contacted counter-currently. Substances promoting the absorption of ammonia, such as lithium chloride, ammonium nitrate and the like, may be added to the water. The ammonia in the ammonia water produced in the collecting station is liberated in a releasing station, which in this case may be an evaporator, and recirculated to the developing section. At the same time, the water vapor necessary for the development of the diazotype material is released. Evaporators which may be used for this purpose are, e.g., those which operate according to the rectifier principle. They comprise a distilling vessel and a rectifying column, at the top of which the ammonia water is introduced. The developer gas is released from the ammonia water. After passing through the rectifying column, the water leaves the evaporator through the discharge pipe of the distilling vessel in the form of residual water containing only traces of ammonia. The ammonia water discharged from the absorption column, which is introduced at the top of the rectifying column, may be supplemented by fresh ammonia water in order to replace the losses caused by the developing process.

If absorption promoting salts are added to the water, as described above, the residual water leaving the evaporator may be conducted to a second evaporator in order to recover the salts.

Alternatively, the carrier used may be an adsorbing medium. In this case, the collecting station comprises one or more adsorption vessels filled with an adsorption medium, through which the exhaust air is passed so that the ammonia contained therein is adsorbed.

Suitable adsorption media are microfilters, for example metal aluminum silicates. Sodium aluminum silicates of types 3A and 4A (size of the pores 3 Angstrom units and 4 Angstrom units, respectively) have proved to be particularly advantageous. Since normal microfilters preferably adsorb water molecules, the pores may be prevented from being occupied by water molecules by preceding the microfilter within the collecting station with an adsorption vessel, so that most of the water is removed from the exhaust air before it passes through the microfilter of the collecting station.

For regeneration of the microfilter, i.e. release of the ammonia, the microfilter saturated with ammonia in the collecting station is heated in the releasing station, and the ammonia thus obtained is returned to the developing section. In the same manner, the water in the silica gel may be released in the releasing station. In order to make up for the losses in the developer gas, ammonia and water may be added to the cycle in this case, also.

Because the ammonia separated from the exhaust air is recycled to the developing section, a good utilization of the ammonia supply is achieved. As a particular advantage, by recycling the ammonia into the developing process in accordance with the present invention, otherwise required additional measures for the disposal of the ammonia collected in the collecting station, such as dilution of the ammonia water produced by absorption to a concentration which permits its draining into a sewage system, are rendered unnecessary.

It is possible to circulate not only the ammonia, but also the carrier, if a carrier is used, the carrier being continuously or intermittently returned from the releasing station to the collecting station, after ammonia is released in the releasing station.

If the ammonia is separated from the exhaust air by absorption in water, for example, and the resulting ammonia water is separated in the releasing station from the water by an evaporator operating according to the continuous rectifying principle, the resulting residual water leaving the evaporator—which contains only traces of ammonia—may be recirculated to the collecting station and used again for absorption. More than in the case of water, this recycling is of importance when microfilters are used as the ammonia carrier, because microfilters are relatively expensive. After regeneration in the releasing station, the microfilter preferably is used again for the adsorption of ammonia in the collecting station.

When water is used as the absorbing medium, a continuous recycling process may be performed by using a rectifying column as the evaporator and a counter-currently operated absorption column as the absorption vessel. In this case, the almost ammonia-free residual water constantly being discharged at the bottom of the rectifying column may be conducted to the top of the absorption column. Within the absorption column, the residual water is counter-currently contacted with the exhaust air, and thus absorbs the ammonia contained in the exhaust air.

If microfilters are used for adsorption, an intermittent or batch method is preferably employed. One or more adsorption columns serving as the collecting station are connected as the releasing station after they have been saturated with ammonia and, likewise, one or more adsorption columns not saturated with ammonia are connected as the collecting station.

After passing through the collecting station, the exhaust air may be conducted through a second collecting station in order to remove minor traces of ammonia still present in the exhaust air. The ammonia obtained by this additional purification process also may be returned to the cycle. Alternatively, a citric acid solution may be used for further purification of the exhaust air, but in this case the ammonia residues absorbed by the solution cannot be re-introduced into the cycle.

Figure 2:
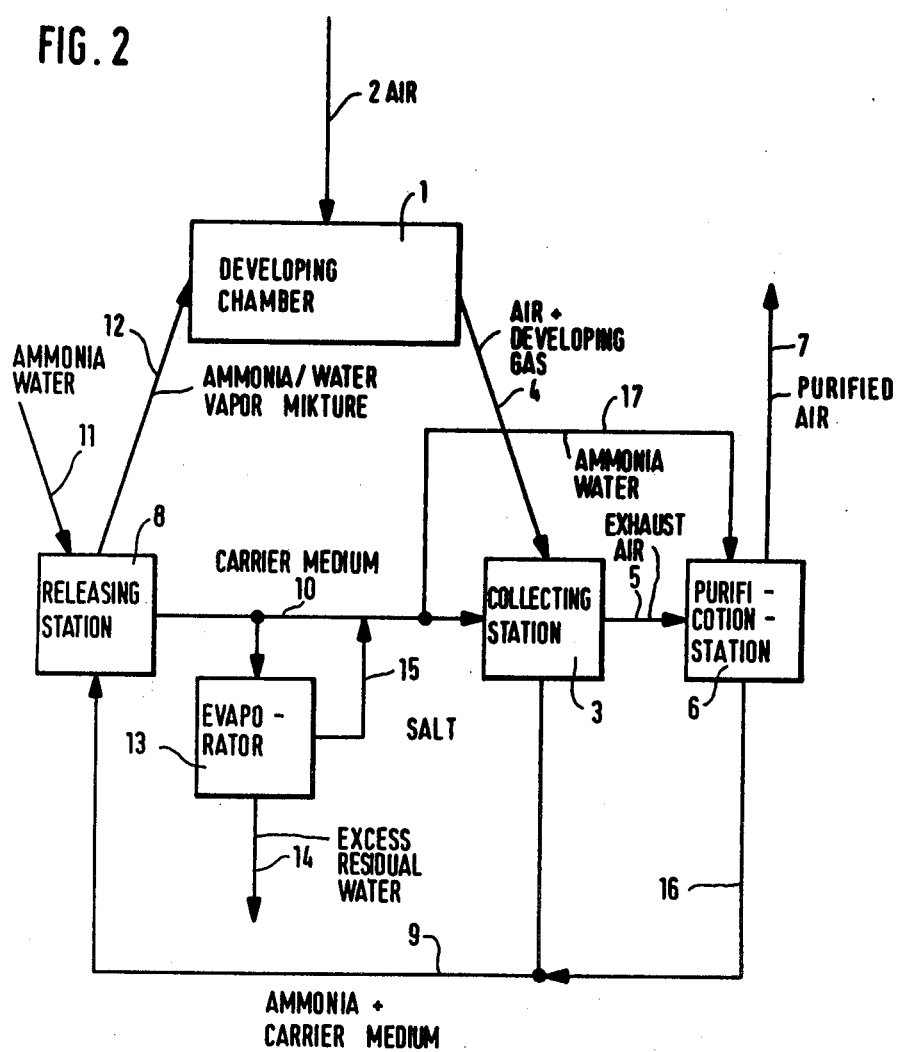
Figure 3:
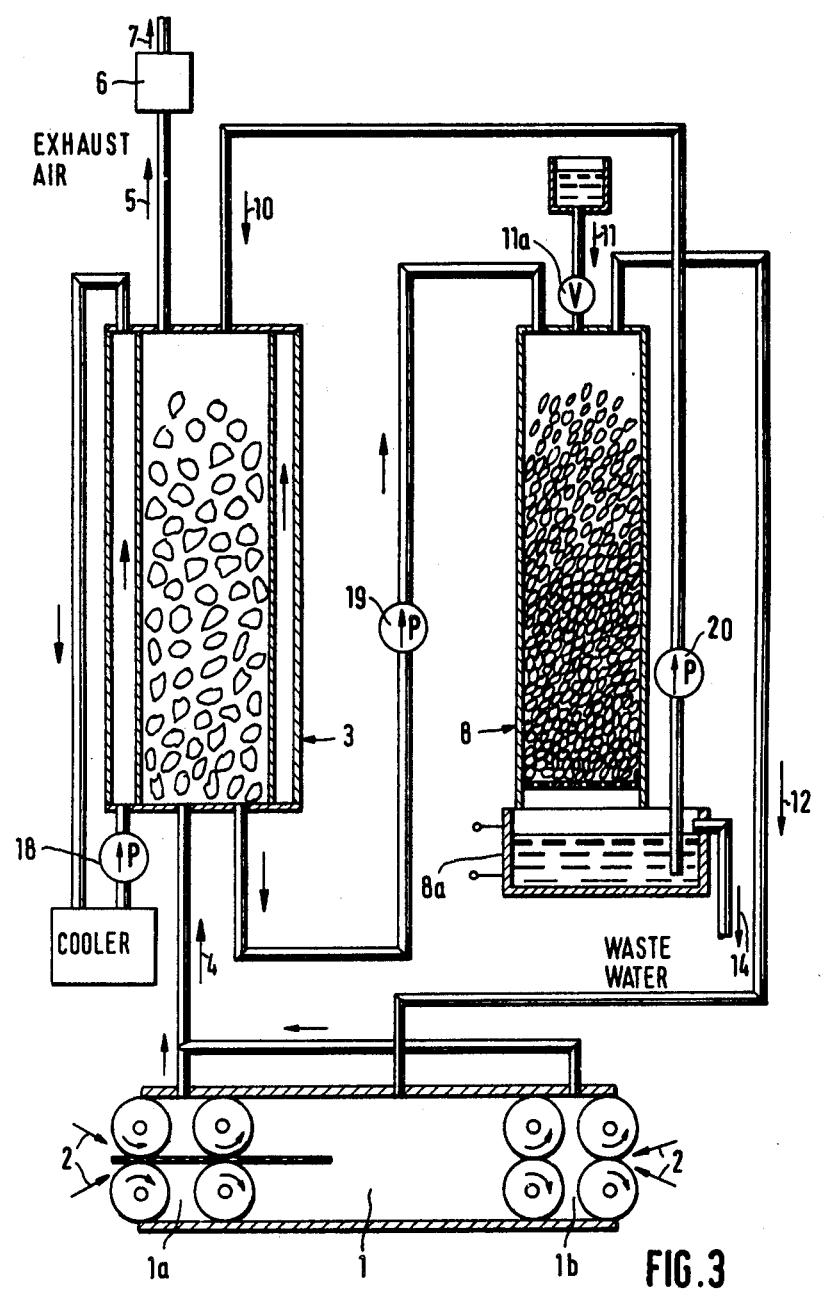
Figure 4:
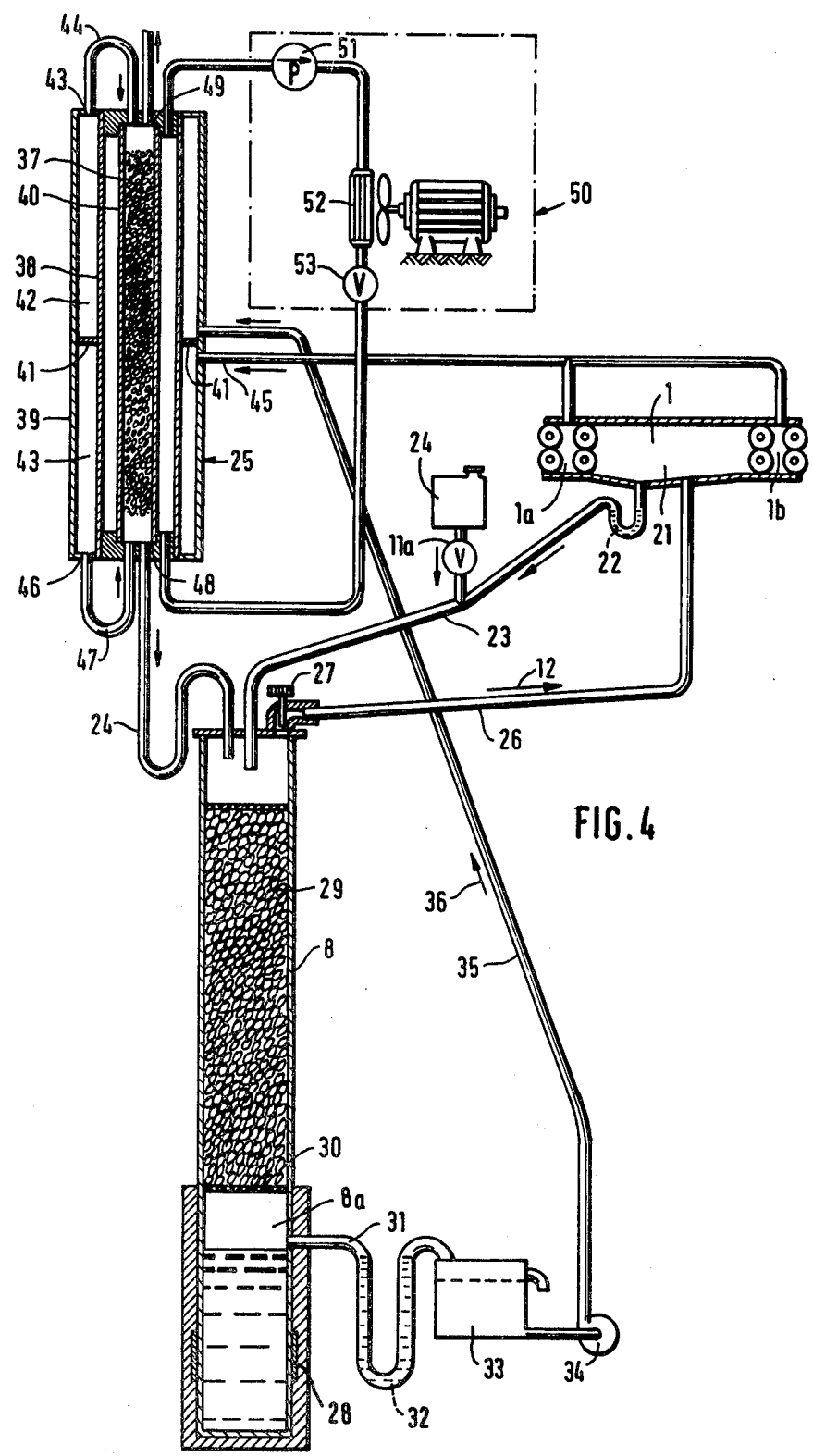
Figure 5:
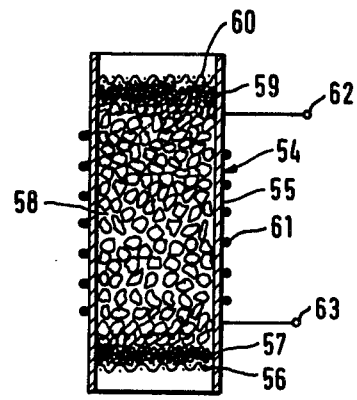
Figures 7, 9:
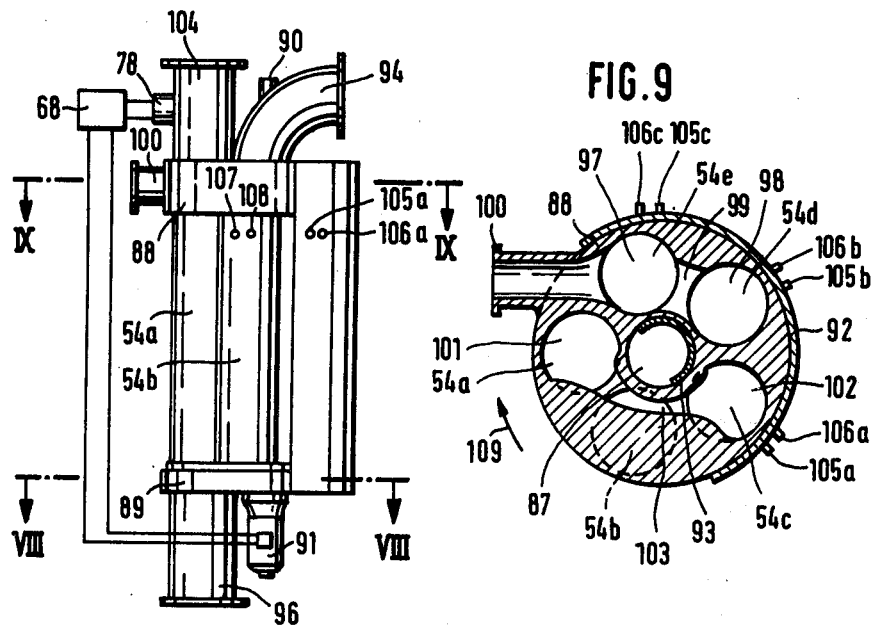
Figure 8:
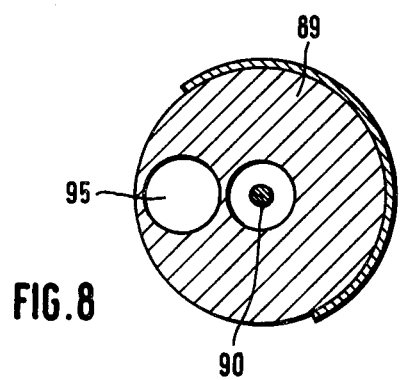
Figure 6:
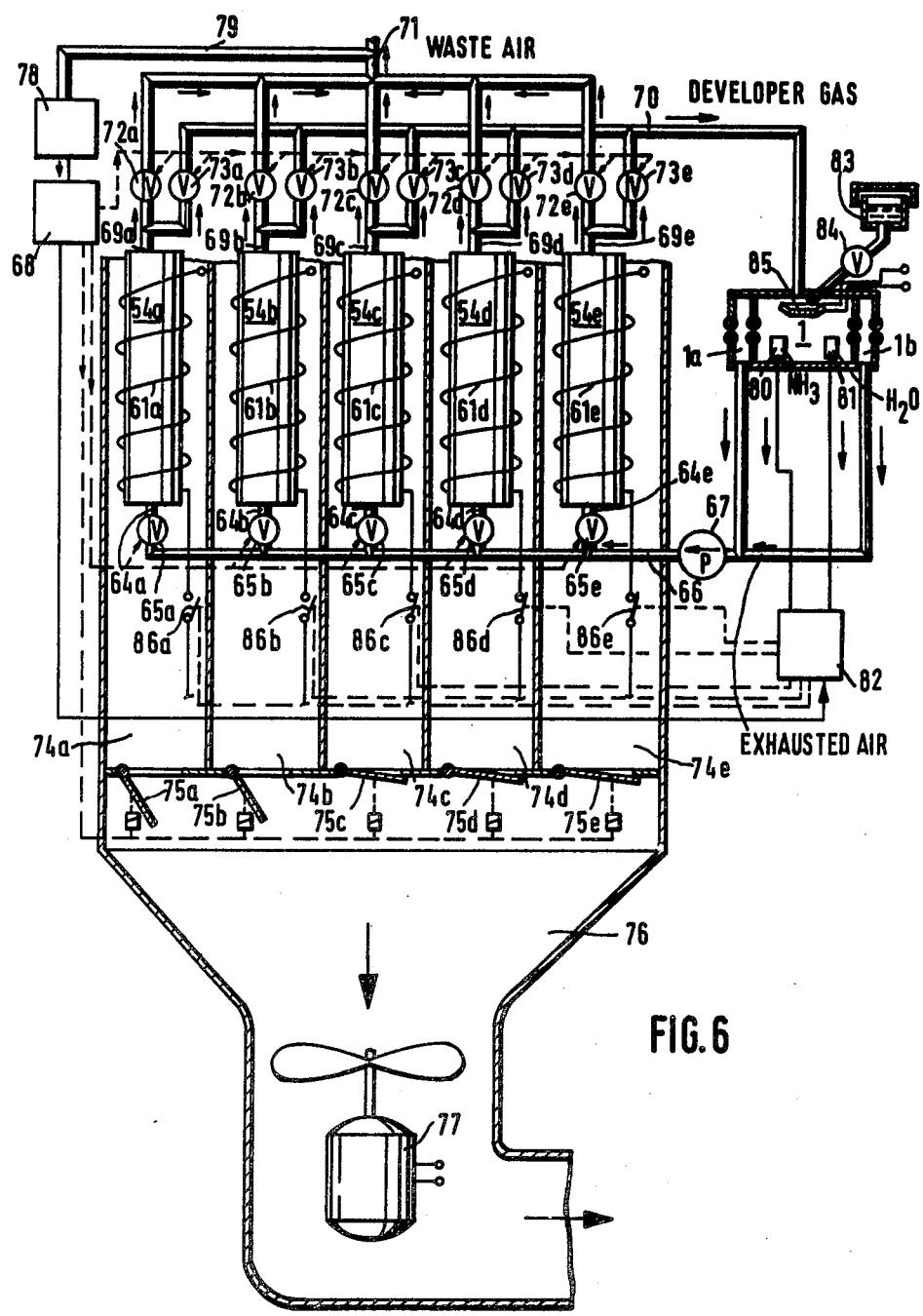
Figure 12:
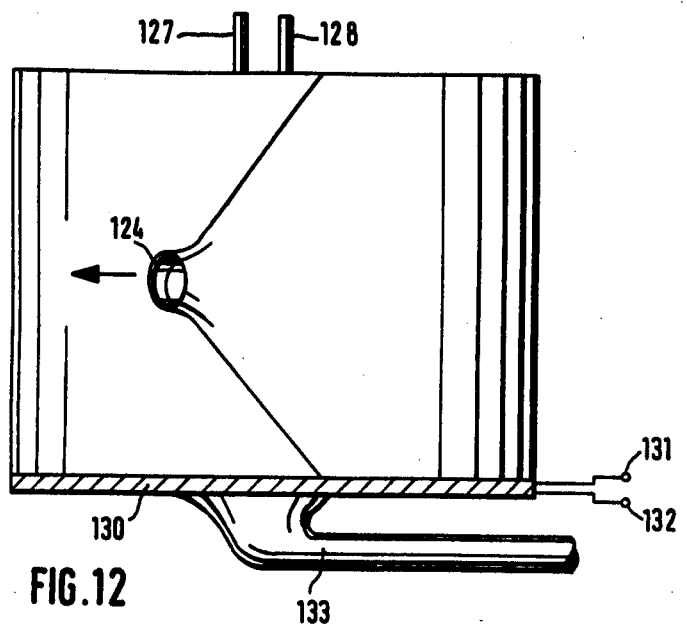
Figure 13:
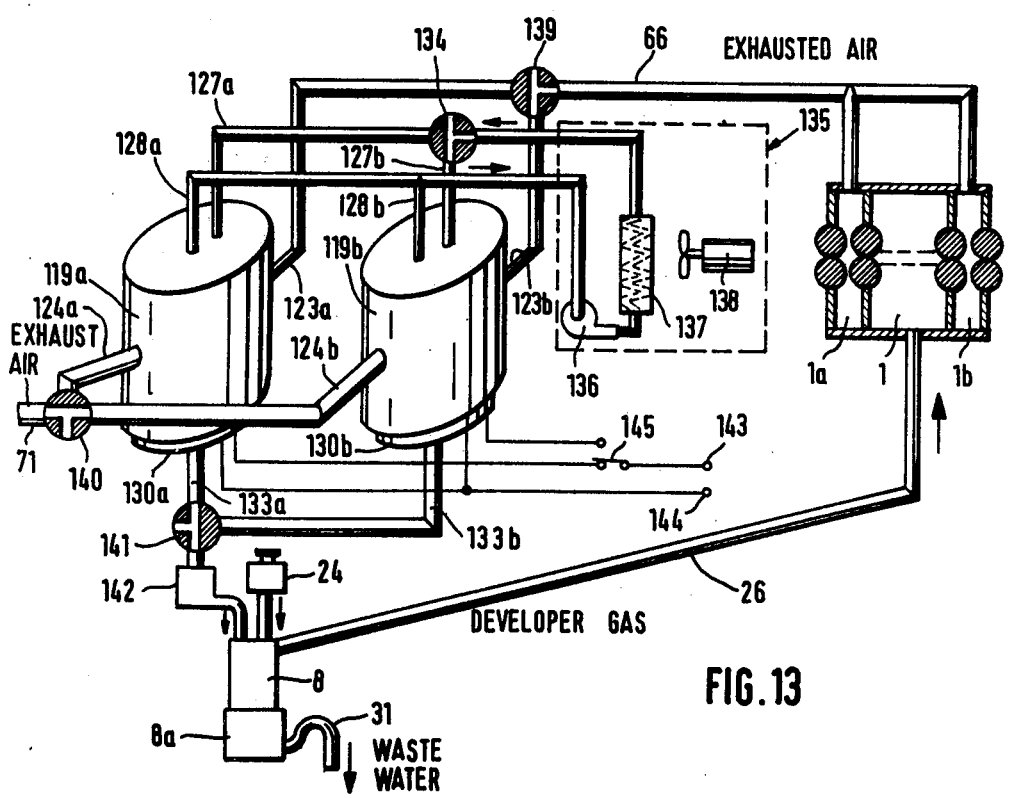

Referring to the accompanying drawings:

FIG. 1 is a block diagram showing the circulation of ammonia and carrier medium, FIG. 2 is a block diagram of a specific embodiment of the invention, FIG. 3 shows an apparatus according to FIG. 1 comprising means for absorbing ammonia vapor, FIG. 4 shows another embodiment of an apparatus according to FIG. 1 comprising means for absorbing ammonia vapor, FIG. 5 is a longitudinal section through an adsorption vessel for separating ammonia and water from exhaust air, FIG. 6 shows five adsorption vessels in an arrangement for separating ammonia and water from the exhaust air of developing station and recirculating it to the developing station, FIG. 7 is a side elevation of a unit of five adsorption vessels, FIG. 8 is a cross-section along line VIII—VIII of FIG. 7, FIG. 9 is a cross-section along line IX—IX of FIG. 7, FIG. 10 is a perspective view of a heat exchanger serving as a cooling trap and used as a collecting for separating ammonia from the exhaust air, FIG. 11 is a top view of the heat exchanger of FIG. 10, FIG. 12 is a side elevation of the heat exchanger of FIG. 11, and FIG. 13 is an arrangement with a releasing station and two heat exchangers which alternatively operate as collecting stations.

In FIG. 1 the developing gas composed of a mixture of air, water, and ammonia is drawn off from the developing chamber 1 in order to prevent it from escaping through the feed and delivery openings for the diazotype material to be developed. At the same time, air is drawn in from the outside through these openings (Arrow 2). The developing gas drawn off from the developing chamber 1 is conducted to the collecting station 3 (Arrow 4). As mentioned above, the collecting station 3 may be composed of one or more cooling traps, absorption vessels, or adsorption vessels. The exhaust air leaving the collecting station 3 (Arrow 5) additionally may pass through a purification station 6 in order to remove any traces of ammonia which may be contained in the exhaust air. Subsequently, the exhaust air leaves the apparatus (Arrow 7). In the embodiment shown in FIG. 1, the purification station 6 contains a carrier medium, for example citric acid, which is not re-introduced into the cycle.

The ammonia frozen out, absorbed, or adsorbed in the collecting station 3 is passed to the releasing station 8 (Arrow 9) and liberated by heating. In the case of the frozen-out ammonia, where water is also frozen out from the developing gas, besides ammonia, no carrier remains after evaporation of the ammonia/water mixture. If the ammonia is absorbed or adsorbed in the collecting station 3, a carrier medium remains after liberation of the ammonia in the releasing station 8, and this carrier medium may be recirculated to the collecting station 3 (Arrow 10). If an adsorption medium is used as the carrier, the adsorption medium saturated with ammonia is heated in order to liberate the ammonia. The use of water as the absorption medium will be described more in detail below.

The ammonia/water vapor mixture liberated in the releasing station 8 is re-introduced into the developing chamber 1 (Arrow 12). In order to compensate for losses of developing gas in the developing chamber, ammonia water is introduced from the outside into the releasing station 8 (Arrow 11). Excess residual water, which is formed as explained below, is withdrawn from the cycle (Arrow 14).

FIG. 2 shows an embodiment in which the carrier medium is water to which absorption-promoting salts have been added. In this case, the collecting station 3 preferably is composed of an absorption column to which the exhaust air drawn off from the developing chamber 1 is fed from below, from the bottom, whereas the water containing the salts is introduced from above, in a counter-current flow to the exhaust air. At the bottom of the absorption column, the water saturated with ammonia is discharged and continuously conducted to the releasing station 8.

A rectifying column is used as the releasing station, as described above. Within the rectifying column, ammonia and water are released by evaporation and are then returned to the developing chamber 1. The residual water discharged from the rectifying column, which contains only traces of ammonia, is recycled to the collecting station 3, together with the absorption-promoting salts contained therein.

Losses of developer gas in the developing chamber 1 are compensated for by adding fresh ammonia water to the cycle (Arrow 11). In most cases, the ammonia water introduced into the cycle differs in its composition (25% of ammonia, 75% of water) from the optimum composition of developer gas preferred for the developing chamber 1, which should have a higher percentage of ammonia. This optimum ratio between gaseous ammonia and water vapor may be obtained by an appropriate adjustment of the temperature in the rectifying column. Since, as already explained, losses in developer gas are made up by the introduction of fresh ammonia water, which contains more water than is necessary for development, the excess of residual water formed in the long run which is not required for absorption in the collecting station 3, is withdrawn from the cycle. In order to maintain the salts contained in the residual water within the cycle, the excess residual water is passed through an evaporator 13 before it leaves the apparatus (Arrow 14), in order to recover the salts. The water leaves the cycle in the form of water vapor (Arrow 14) and may leave the apparatus together with the exhaust air (Arrow 7). It is also possible to separate the salts, by another method, from the excess of residual water which leaves the apparatus, for example by reverse osmosis. The salts separated in station 13 are recycled to the collecting station 3 (Arrow 15).

In the embodiment shown in FIG. 2, an absorption column is used as the purification station 6, where the last traces of ammonia are absorbed in water containing absorption-promoting salts. The resulting ammonia water is conducted to the releasing station 8 (conduit 16) from where it is again conducted to the purification station 6 (conduit 17) after the ammonia has been liberated.

The best mode of practicing the invention makes use of water as an absorption carrier medium. This process is performed with the apparatus according to FIGS. 3 and 4.

In connection with the apparatus according to FIGS. 3 and 4 a developer station is provided comprising a developing chamber 1 and two antechambers 1a and 1b. The chambers 1a and 1b are formed between two pairs of rollers, each of which roller pair transport a sheet of diazotype material through the developing chamber 1.

A packed column 3 is provided for the absorption of ammonia drawn off from the chambers 1a and 1b.

The ammonia/water vapor escaping from the developing chamber 1 into the chambers 1a and 1b is involuntarily mixed with air penetrating between the rollers of the outer pairs of direction of the arrows 2. This mixture contains about 4 percent of ammonia (by weight). This ammonia concentration is considerable in view of the air pollution resulting if the air enriched with ammonia were directly discharged into the environment. On the other hand, the concentration of ammonia is too low for recycling the air/ammonia vapor mixture directly into the developing chamber.

Therefore, in FIG. 3 this mixture is passed into the bottom of a packed column 3 in which column the air/ammonia vapor mixture rises against a stream of water introduced at the top of the column. Preferably, the column 3 is cooled with water having a temperature of less than 4° C. which flows upwardly between concentric outer walls of the column. In the column 3 the air/ammonia vapor mixture flows counter-currently to the liquid water introduced at the top of the column and an intimate contact of the two phases is effected. Thereby, the water flowing down the column absorbs the ammonia contained in the mixture while the ammonia concentration decreases in the air rising in the column. Then, the air issuing from the top of the column 3 is conducted through a conduit into the additional purification station 6 containing, especially, citric acid. The waste air issuing from this purification station has an ammonia concentration of less than 5 parts per million.

While the residual ammonia cannot be easily released from the citric acid, this is possible in the case of the water containing absorbed ammonia which is pumped out at the bottom of the column 3. This water has an ammonia concentration of less than 10 percent by weight which may be too high for waste water. The water enriched with ammonia leaving the column 3, however, is conducted to the top of a second packed column 8. A distillation flask 8a acting as a vaporizing means is provided at the bottom of the column 8. It generates water vapor which streams up in the column 8 thereby releasing ammonia from the ammonia/water mixture streaming down in the column 3. The ammonia/water vapor produced by this process is conducted back into the developing chamber 1. The concentration of ammonia in the ammonia/water vapor depends upon the temperature of the vaporizing means. The temperature may be adjusted, so that the vapor issuing from the top of the column 8 contains about 20 percent by weight of ammonia.

The water collected in the vaporizing means 8a contains only about 0.01 percent of ammonia. Part of this water is pumped to the top of the column 3. The excess water issues from the vaporizing means 8a by a waste water discharge.

Fresh developing solution is added at the top of the column 8 through a valve 11a as indicated by the arrow 11.

FIG. 3 shows three pumps. Pump 18 serves to circulate the cooling medium, preferably water, in a circuit which also includes the column 3. Pump 19 is part of a transport means which conducts the carrier medium enriched with ammonia from the bottom of column 3 to the top of the second packed column 8. The third pump 20 is a part of a second transport means which conducts the absorbing carrier liberated from ammonia from the vaporizing means of column 8 to the top of column 3.

The developing chamber 1 shown in FIG. 3 is operated at such pressure and at such temperature that the developer medium (ammonia/water vapor mixture) introduced in the direction of the arrow 12 will not condense in the developing chamber. More especially, the water vapor pressure prevailing in the developing chamber is less than the saturated vapor pressure of water under identical conditions, and the temperature is maintained at about 70°, preferably about 80° to 95° C.

Although the present invention primarily deals with the problems of freeing ammonia-containing exhaust air from ammonia and use of the ammonia again for the developing process, the process of the invention also may be used for freeing the ammonia-containing condensate produced in the developing chamber from substantial amounts of ammonia before discharging it into the surroundings as waste water. An arrangement suitable for this purpose is shown in FIG. 4 which, although it is largely identical, differs from the apparatus hitherto described in a few details outlined below:

The developing chamber shown in FIG. 4 is provided with a cavity 21 in which the condensate collects and from whence it flows off through the siphon 22 and a conduit 23 to the top of the packed column 8. The outlet of a storage vessel 24 for aqueous ammonia solution also opens into the conduit 23. The storage vessel 24 may be closed by the valve 11a.

Further, the U-shaped outlet 24a of an absorption column 25 opens into the packed column 8 at the head thereof. A conduit 26 leads from the head of the packed column 8 to the developing chamber 1, and within that conduit the ammonia-containing developer medium flows in the direction indicated by the arrow 12. Near the head of the packed column 8, a temperature regulator 27 is arranged within the conduit 26 which determines the outlet temperature of the developer gas and thus the composition of the developer gas (proportions of water and ammonia). The temperature regulator 27 is connected to a circumferential heater 28 which surrounds the distillation flask 8a.

As in FIG. 3, the packed column of FIG. 4 contains the packing 29, for example saddles, which are stacked up on the perforated plate 30.

The distillation flask 8a is provided with an overflow 31 for the water, this overflow being constructed as a siphon 32 in order to produce a gas-tight seal between the distillation flask 8a and a container 33 for waste water. The interior of the container 33 is connected with the absorption column 25 by a pump 34 and a water supply pipe 35, so that waste water may be pumped to the absorption column 25 in the direction of the arrow 36.

The absorption column 25 includes an absorption chamber 37, a cooling jacket 38, and an outer jacket 39. The cooling jacket 38 and the outer jacket 39 are coaxially arranged around the absorption chamber 37. The interior of the absorption chamber 37 is filled with the packing material 45. By a partition 41 extending in the cross-sectional direction, the space between the inner jacket 38 and the outer jacket 39 is subdivided into an upper compartment 42 and a lower compartment 43.

The upper compartment 42 is connected with the water supply pipe 35 and serves as a pre-cooling zone for the water. The pre-cooled water leaves the upper compartment 42 through the pipe 43 and is passed from above into the absorption chamber 37 through the pipe 44. The lower compartment 43 is provided with an inlet 45 for the exhaust air issuing from the ante-chambers 1a and 1b. The lower compartment 43 serves a pre-cooling zone for exhaust air which leaves the compartment 43 through the outlet 46 and is passed from below into the interior of the absorption chamber 37 through the pipe 47. The inlet opening connected to the water supply pipe 35 and the inlet opening 45 for the exhaust air are fitted to the upper and lower compartments 42 and 43 in such a manner that the water and the exhaust air must pass through as long as possible a pre-cooling zone before leaving the compartments 42 and 43.

The exhaust air flows from below through the absorption chamber 37 filled with the packing material 40, i.e. in countercurrent flow to the water which cascades from above. The water enriched with ammonia separated from the exhaust air leaves the absorption chamber 37 through the discharge pipe 48 attached to the bottom of the chamber and, after passing through the U-shaped pipe 24, reaches the head of the packed column 8, wherein the ammonia is released from the water as described above in connection with FIG. 3 and recirculated to the developing chamber through the pipe 26. The purified exhaust air leaves the absorption chamber 37 through the gas outlet 49.

The cooling jacket 38 of the absorption column 25 is connected to a system 50 in which a cooling medium is circulated. The cooling system 50 includes a compressor 51, a condenser 52, and a valve 53.

The advantages of processes using water as the absorption medium are primarily that simple and approved apparatuses may be used for their performance. The apparatuses are durable because no poisoning occurs and they are resistant to wear. Water is an inexpensive and easily replaceable absorption medium which may be introduced without difficulty, because ample quantitites thereof are contained in the aqueous ammonia solution from which the developer medium is generated. Water as the absorption medium is safe, even if some of it is spilled, and the process may be operated with a relatively low expenditure of energy.

FIGS. 5 to 9 are diagrammatic representations of an absorption plant and parts thereof serving to perform the process of the present invention, which operates according to the adsorption principle.

FIG. 5 shows a single adsorption vessel 54, which is composed of a jacket 55 in which the adsorbing material 58 is arranged on top of a layer of an inert granulate 57 disposed on a perforated bottom 56.

The adsorbing material may take different shapes and may be composed of, for example, balls of about 5 mm diameter, of rods of 3 mm diameter and 8 mm length, or of a powder the grains of which preponderantly range in size between 20 and 50 μm diameter or of shaped bodies. Preferably, the adsorbing material is composed of aluminum oxide ($Al_2O_3$).

Molecular sieves preferably such having a pore width of 4 Ångström units which contain adsorbing material, enable a particularly good adsorption of water and ammonia. Such molecular sieves are capable of adsorbing up to 20 percent of their own weight of water. Like adsorbing materials of other shapes, the molecular sieves may be repeatedly used, but must be regenerated and reactivated between two adsorption processes. Regeneration and reactivation are effected by heating the molecular sieves to about 500° C. and then cooling them again, cooling to ambient temperature being sufficient. The molecular sieve of type 13 X of Messrs. Mobilbit was found to be suitable. The following companies supply such sieves: Union Carbide, Germany, Dusseldorf; Bayer Leverkusen; and Grace, Bad Homburg. Further details of molecular sieves in general may be taken from Gruber, Jero & Ralek: "Molecularsiebe" (Molecular Sieves), published by "Verlag der Wissenschaften".

Further, FIG. 5 shows that the adsorbing material is also covered by a layer of an inert granulate 59 beneath a second perforated plate 60.

In order to heat the adsorbing material, the jacket 55 is surrounded by an electrical heater 61 with contacts 62 and 63.

FIG. 6 shows an arrangement in which five adsorption vessels according to FIG. 5 are operatively connected to a developing chamber having two ante-chambers 1a and 1b. Each of the five adsorption vessels alternatively may be operated as collection station or as releasing station, as will be described in the following. When an adsorption vessel is operated as a collecting station, it is maintained at a low temperature, preferably room temperature, and has an adsorbing effect, and when it is operated as a releasing station, the adsorption vessel is heated and serves to regenerate the adsorbing material.

With regard to the function of the adsorption vessels—which will be described in more detail by reference to FIG. 6—when used for adsorption the above-mentioned conventional adsorption materials ($Al_2O_3$) first adsorb water and then ammonia; on the other hand, when used for explusion or regeneration, they first release ammonia and then water.

In FIG. 6 the gas connections 64a, 64b, 64c, 64d, and 64e, near the bottoms of the adsorption vessels, are connected via the valves 65a, 65b, 65c, 65d, and 65e, respectively, to an exhaust air duct 66 conducting the exhaust air drawn from the ante-chambers 1a and 1b. Pump 67 serves to draw the ammonia-laden air from the ante-chambers 1a and 1b. Valves 65a to 65e may be actuated in accordance with a stepping mechanism 68, as indicated by the broken line in FIG. 6.

Each of the adsorption vessels is provided, at its upper end, with a gas outlet 69a, 69b, 69c, 69d, and 69e, respectively, which may be connected via a pipe 70 to the developing chamber 1, or to a duct 71 for exhaust air. For this purpose, two parallel valves 72a and 73a (72b and 73b, 72c and 73c, 72d and 73d, and 72e and 73e, respectively) are provided at the gas outlet of each adsorption vessel. The valves also are operated in accordance with the stepping mechanism 68, as indicated by the broken line.

Each adsorption vessel is accommodated in a wind tunnel 74a, 74b, 74c, 74d, and 74e, which may be closed by a lid 75a, 75b, 75c, 75d, and 75e. The wind tunnels 74a to 74e open into a channel 76 containing a blower 77 which also may be used for cooling the copying machine. The lids 75a to 75e are also actuated in accordance with the signals of the stepping mechanism 68.

The stepping mechanism 68 receives a signal from a measuring device 78 which measures the ammonia concentration of the exhaust air. For this purpose the measuring device, preferably one operating according to the infrared adsorption principle, is connected, by the line 79, with the duct 71 for the exhaust air. Further, a sensing element 80 detecting the ammonia concentration in the developing chamber and a sensing element 81 detecting the water vapor concentration in the developing chamber are provided in the developing chamber 1. Both sensing elements are connected to a control device 82 which serves to actuate the switches 86a to 86e connected to the electrical heaters 61a, 61b, 61c, 61d, and 61e of the adsorption vessels and valve 84.

In the present case, the developing station operates according to the total evaporation method, i.e. the aqueous ammonia solution taken from the storage tank 83 is fed through the valve 84 directly to an evaporator 85 in the developing chamber 1, where it is heated to a temperature sufficiently high that no condensate is formed in the developing chamber 1.

In the following, the function of the arrangement shown in FIG. 6 is described under the assumption that the developing chamber 1 is in operation and is filled with the ammonia/water mixture required for development. Further, it is assumed that the adsorption vessel 54a is connected to the pipe 66 to receive the exhaust air drawn from the ante-chambers 1a and 1b, as is indicated by the solid line in the symbol designating the valve. At this stage, the adsorption vessel 54a is effective to adsorb ammonia from the exhaust air, water being simultaneously adsorbed. For this purpose, the adsorption vessel 54a is exposed to the current of cooling air generated by the blower 77 and is maintained at room temperature. The lid 75a is opened. The air leaving the adsorption vessel 54a, which is substantially freed from ammonia, reaches the exhaust air duct 71 through the opened valve 72a. During this passage, the ammonia concentration of the exhaust air in the line 79 is measured by the measuring device 78. The switching state shown in FIG. 6 is maintained by the stepping mechanism 68 as long as the ammonia concentration does not exceed a certain, predetermined value. If this value is attained, it indicates that the adsorption vessel 54a is saturated and that another vessel with fresh adsorbing material must be switched in.

While the adsorption vessel 54a is used for adsorption in the phase shown in FIG. 6, adsorption vessels 54d and 54e at this stage supply ammonia and water vapor, as components of the developer gas fed into the duct 70. For this purpose, the valves 73d and 73e are opened. At this operational phase, the switch position of the switches 86d and 86e depends on the ammonia and water vapor concentrations measured by the sensing elements 80 and 81 in the developing chamber 1. In a first expulsion step, ammonia is driven from the material with which the absorption vessel 54e is filled. During a second step, primarily water is removed from the adsorbing material contained in the adsorption vessel 54d. The composition of the developer gas fed to the developing chamber 1 is dependent upon how long the switch 86e of the heater of the adsorption vessel primarily yielding ammonia is actuated and upon how long the switch 86d controlling the heater of the adsorption vessel primarily yielding water is actuated. In a third expulsion step, one of the adsorption vessels is regenerated by complete removal of all adsorbed substances. For this purpose, as shown in FIG. 6, the adsorption vessel 54c is connected to the exhaust air duct 71 and the switch 86c remains closed until residual water is removed from the adsorbing material by prolonged heating.

Prior to the next adsorption step, it is necessary for the material freed from adsorbed substances to be prepared for renewed adsorption, which is effected by cooling the material. For this purpose, as the last step for activating the adsorption vessel 54b, the heater is switched off by means of the switch 86b and the lid 75b is opened, so that the cooling air supplied by the blower 77 may pass the adsorption vessel 54b unhindered.

Thereafter, the adsorption vessel 54b may be used again as an adsorbing station.

The ammonia losses occuring in the cycle including the developing chamber 1, the ante-chambers 1a and 1b, the duct 66, the adsorption vessels 54, and the duct 70, and the ammonia losses caused by the copying material leaving the developing chamber, are replaced by direct evaporation of aqueous ammonia solution introduced through the dosing valve 84.

Thus, in FIG. 6, the adsorption vessel 54a is the adsorbing station, whereas the adsorption vessels 54c, 54d, and 54e form the releasing stations at this stage. The adsorption vessel 54c is not connected to the developing chamber, however, and does not participate in the adsorption and reintroduction cycle of the substances effecting development.

When the ammonia concentration in the exhaust air duct 71 increases, the adsorption vessels are switched on, i.e., the valves are switched over in such a manner that one of the adsorption vessels always serves as the adsorbing station and two adsorption vessels serve as releasing stations, whereas the two remaining adsorption vessels are connected neither to the exhaust air duct 66 nor to the developer gas pipe 70 in order to effect complete regeneration and reactivation.

FIGS. 7, 8, and 9 describe a particularly advantageous structural unit comprising 5 adsorption vessels and the elements associated therewith.

The five adsorption vessels 54a, 54b, 54c, 54d, and 54e are arranged in a circle around an inner channel 87 and are firmly connected with each other. The adsorption vessels are separated by identical distances, and there are free spaces between them. The adsorption vessels have top and bottom openings which may be closed by the plate cams 88 and 89 to be described in the following.

The five adsorption vessels may be rotated as an entity about an axis 90 protruding from the plate cams 88 and 89. The adsorption units are driven by a motor 91 bolted on the lower plate cam 89. At the outside of the plate cam, part of the imaginary jacket between the plate cams is covered by a guide jacket 92. Corresponding to this outer guide jacket there is also an inner guide jacket 93 within the inner channel 87. The outer and inner guide jackets are so dimensioned that, when viewed from above, they cover the same sector of the cross-section of the adsorption vessels, i.e. in each position they cover three adsorption vessels, in FIG. 9 the adsorption vessels 54c, 54d, and 54e. The inner channel 87 is connected to a connection piece 94 for cooling air.

The lower plate cam 89 shown in FIG. 8 contains a single round opening 95 over which the lower opening of one of the adsorption vessels may be rotated. The opening 95 opens into a connection piece 96 which may be connected to a duct for the exhaust air drawn from the ante-chambers.

In the upper plate cam shown in FIG. 9, two openings may be distinguished which are spaced from each other by the distance between two adjacent adsorption vessels. These openings 97 and 98 are connected by a channel 99 and are in connection with a connecting piece 100 to which a duct for feeding developer gas to the developing chamber may be attached. Further, the upper plate cam contains two further openings 101 and 102 located at a distance from each other which corresponds to the distance between two adsorption vessels separated by a third adsorption vessel, and which are connected by a second connecting channel 103. Further, they are connected to a perpendicular connecting piece 104 for attaching an exhaust air duct. The connecting piece contains the measuring device 78 for determining the ammonia concentration which is electrically connected to the stepping mechanism 68. The stepping mechanism is connected to the motor 91.

In the constructional unit shown in FIGS. 7 to 9, the valves and lids shown in FIG. 6 are replaced by plate cams. All control functions are performed by rotation of the group of adsorption vessels. This control is particularly easy and reliable. It requires completion, however, as regards the electrical heating of the adsorption vessels, which corresponds to that of the version shown in FIG. 5. In order to connect the electrical heaters of three adsorption vessels—no more than three adsorption vessels may be heated at the same time—two contacts each—105a and 106a, 105b and 106b, and 105c and 106c—are provided in the outer guide jacket, which are spaced from each other by the distance between the adsorption vessels. Each adsorption vessel is provided with a corresponding pair of contacts, which may be connected with the contacts in the outer jacket by rotating them in position opposite the contacts in the outer jacket. In FIG. 7, a pair of contacts 107 and 108 is shown on the adsorption vessel 54b. The contacts 105c, 106c, and 105b, 106b are connected to a control device of a similar structure as the control device 82, whereas the contacts 105a and 106a are permanently connected to a current source. Contacts 105c and 106c are in connection with the measuring arm for the ammonia concentration in the developing chamber, and the contacts 105b and 106b in connection with the measuring arm for the water vapor concentration in the developing chamber (sensing elements 80 and 81 in FIG. 6).

In the following, the structural unit according to FIGS. 7 to 9 will be described, as far as its functions deviate from those of the unit shown in FIG. 6.

In the relative position of the adsorption vessels and the plate cams shown in FIGS. 7 to 9, especially FIG. 9, ammonia-containing air drawn from the ante-chambers flows through the adsorption vessel 54a. Adsorption vessel 54a and adsorption vessel 54b are within a current of cool air, because air is constantly drawn off from the connecting pieces 94.

Consequently, ammonia is adsorbed from the ammonia/air mixture passing through the adsorption vessel 54a, and the exhaust air, now substantially free from ammonia, flows off through the ventilating outlet 104. On the other hand, adsorption vessel 54e which is next in a clockwise direction, is substantially protected from the current of cool air by the inner guide jacket 93 and the outer guide jacket 92. Further, the adsorption vessel 54e is heated in accordance with the control device responding to the ammonia concentration within the developing chamber, so that, in a first expulsion phase, ammonia gas is released by the adsorbing material contained in the adsorption vessel. This ammonia gas may escape through the pipe connection 100 and be conducted to the developing chamber. In a similar manner, the adsorption vessel 54d is connected by the connecting channel 99 with the pipe connection 100, so that the substance expelled from adsorption vessel 54d also reaches the developing chamber. In a second expulsion phase, primarily water vapor is released from the adsorption vessel 54d. This is also in accordance with the control device to which the actual value of the water vapor concentration in the developing chamber is fed. Adsorption vessel 54c, which follows next in a clockwise direction, is not exposed to the current of cooling air, the same as adsorption vessel 54d, and is constantly heated in order to expel residual water still present on the adsorbing material after the second expulsion step. The water vapor thus generated is also conducted to the ventilating outlet 104 through the second connecting channel 103.

When the adsorbing material within the adsorption vessel 54a is filled to capacity, the ammonia concentration of the exhaust air measured in the ventilating outlet 104 increases significantly. When a corresponding measurement is made by the measuring device 78 the stepping mechanism 68 causes the electromotor 91 to rotate the group of adsorption vessels by the distance between individual adsorption vessels.

FIG. 9 shows that the adsorption vessels are rotated clockwise—see arrow 109—so that adsorption vessel 54a takes the position formerly held by adsorption vessel 54e, which, in turn, now takes the place of adsorption vessel 54e and so forth. In principle, all adsorption vessels 54a to 54e are operated in the same manner as the stationary adsorption vessels shown in FIG. 6.

Adsorption processes for removing ammonia from exhaust air and recovering it for development, are particularly advantageous because it is not necessary to use a liquid carrier. The difficulties which may occur in a process using liquids, such as losses caused by leaks, are thus avoided.

In the following, a heat-exchanger serving as a cooling trap and a cycle in which this heat-exchanger is used for performing the process of the invention, will be described by reference to FIGS. 10 to 13:

FIG. 10 shows a double-channel helical heat-exchanger 119 without the steel jacket by which it is surrounded. The heat-exchanger comprises two adjacent heat-exchange channels 120 and 121, which are helically wound one upon the other, as shown especially in FIG. 11.

The helical arrangement shown in FIG. 11 is further surrounded by a steel jacket 122. Channel 120 is provided with an inlet 123, whereas channel 121 has an outlet 124. In FIGS. 11 and 12, the inlets and outlets are shown as pipe connections. In the center of the helix the two channels have an open connection. In the center of the helix, a cooling coil 126 is arranged through which a cooling medium flows. The cooling coil 126 has an inlet 127 and an outlet 128 for the cooling medium.

Whereas FIGS. 10 and 11 show only the heat-exchange channels with their connecting pipes and the cooling coil, the side elevation according to FIG. 12 shows that the heat-exchanger is covered on all sides by the steel jacket 122 which forms in particular the lid and the bottom of the heat-exchanger. Further, FIG. 12 shows a base plate 130 which is provided with an electrical heater, the electrical contacts of the heater being designated by the numerals 131 and 132. The base plate is provided with openings, so that a drain pipe 133 may be passed therethrough.

FIG. 13 shows an ammonia cycle comprising two heat-exchangers serving as cooling traps. The heat-exchangers are designated 119a and 119b. The cooling medium inlets 127a and 127b are connected to a cooling unit 135 by a three-way valve 134. The outlets 128a and 128b for the cooling medium are permanently connected to the cooling unit 135. The cooling unit 135 includes a condenser 136 and a refrigerator 137 with a ventilator 138.

The inlets 123a and 123b of the heat-exchangers are connected, through a second three-way valve 139, to an exhaust gas duct 66 which is also in connection with the ante-chambers 1a and 1b. The outlets 124a and 124b of the heat-exchangers may be connected to the exhaust air duct 71 by a third three-way valve 140. The connecting pipes 133a and 133b lead to a collecting vessel 142 via a fourth three-way valve 141. The collecting vessel leads to a packed column 8 of the structure shown in FIG. 4. The developer gas pipe leading from the packed column 8 to the developing chamber is again designated as 26. The outlet for excess residual water bears the reference number 31. The top of the packed column is in connection with a storage tank for aqueous ammonia solution from which additional developer gas to be introduced into the cycle is generated.

Finally, FIG. 13 shows how a source of electrical current which may be connected to the contacts 143 and 144 can be optionally connected either with the heatable base plate 130a or the heatable base plate 130b, depending on the position of the switch 145. In the positions of the three-way valves 134, 139, 140 and 141 shown in FIG. 13 and in the position of the switch 145, the heat-exchanger 119b operates as the collecting station, whereas the heat-exchanger 119a operates as the releasing station. For this purpose, cooling medium cooled in the cooling unit 135 is caused to flow through the cooling coil of the heat-exchanger 119b. The heat-exchanger 119a, however, is electrically heated.

The ammonia-laden air drawn from the ante-chambers 1a and 1b by means of a pump—not shown in FIG. 13—flows into the heat-exchanger 119b through the inlet 123. Within the heat-exchanger, the exhaust air containing ammonia flows through a first heat-exchanger channel into the center of the helix, circulates around the cooling coil 126 shown in FIGS. 10 and 11 and passes into the second heat-exchange channel. From there, it flows through the outlet 124b into the exhaust air duct 71. Between the inlet 123 and the center of the helix, the exhaust air is in heat exchange contact, through the walls of the heat-exchange channels, with the cold current of exhaust air flowing in the opposite direction. In this manner, an efficient utilization of the cooling effect of the cooling coil is guaranteed.

Ammonia and water freezing out from the exhaust air during its passage through the heat-exchanger collect in the form of ice on the walls and on the bottom of the heat-exchanger. When the heat-exchanger is nearly filled with frozen substances during the cooling phase, the frozen ammonia and water are melted off. For this purpose, the base plate 130a of the adsorption vessel 119a is heated as is shown in FIG. 13. The three-way valve 141 is so positioned that the ammonia/water mixture is discharged from the adsorption vessel 119a. The ammonia/water mixture flows into the collecting vessel 142 and from there into the packed column 8 in which the ammonia-containing developer gas is generated from the mixture of ammonia and water. The water flowing from the packed column 8 to the distillation flask 8a is substantially free from ammonia. Insofar as it is not vaporized for generating the vapor current for the packed column, the water flows off through the outlet 31. Losses of ammonia are replaced by adding fresh ammonia from the storage tank 24.

When the ammonia-water mixture stored in the heat-exchanger 119a has been melted and discharged, the arrangement shown in FIG. 13 is changed over, so that the cooling medium flows into the cooling medium inlet 127a through the three-way valve 134, whereas the cooling medium inlet 127b is no longer supplied. Switch 145 is reversed so that it is now heat-exchanger 119b which is heated. Further, the third three-way valve 140 is reversed, so that the outlet 124a of the heat-exchanger 119a is connected to the exhaust air duct 71. Finally, the fourth three-way valve 141 is switched to allow the ammonia-water mixture issuing from the heat-exchanger 119b to flow into the collecting vessel 142. Altogether, in this position of the reversible elements, the heat-exchanger 119a serves as the collecting station and the heat-exchanger 119b serves as the releasing station. In the following operational phase, the heat-exchangers exchange their functions again.

The cooling coils provided in the heat-exchangers 119a and 119b may be replaced by other cooling sources, for example those using an evaporating liquid.

The process performed with the arrangement and elements according to FIGS. 10 to 13 has the advantage that a separate carrier adsorbing the ammonia can be dispensed with. Further, it is of advantage that the process is essentially dry.

It will be obvious to those skilled in the art that many modifications may be made within the scope of the present invention without departing from the spirit thereof, and the invention includes all such modifications.

What is claimed is:

1. A process for conducting ammonia in a diazo copying machine which comprises passing ammonia-containing exhaust air by first conduit means from a developing station of said copying machine through a cooled heat exchanger in which the ammonia and water is frozen out, then heating said heat exchanger to a temperature at which the water and the ammonia are liquified, passing the mixture of liquified water and liquified ammonia to a releasing station, adding fresh ammonia water to the liquified water and to the liquified ammonia, passing it together with the liquified water and liquified ammonia in the releasing station counter-currently to vapor produced by a vapor-generating means, and conducting the gaseous ammonia to the developing station, said process employing two heat exchangers, the first heat exchanger through which the exhaust air is passed being cooled and the second heat exchanger being heated for liquifying the ammonia and water frozen out during the preceding process step, whereby the second heat exchanger is cooled and the first heat exchanger is heated.

* * * * *